(12) United States Patent
Andry et al.

(10) Patent No.: US 11,362,382 B2
(45) Date of Patent: Jun. 14, 2022

(54) SIMPLIFIED HERMETIC PACKAGING OF A MICRO-BATTERY

(71) Applicant: International Business Machines Corporation, Armonk, NY (US)

(72) Inventors: Paul S. Andry, Yorktown Heights, NY (US); Bing Dang, Chappaqua, NY (US); John U. Knickerbocker, Yorktown Heights, NY (US); Yang Liu, Wappingers Falls, NY (US); Jae-Woong Nah, Closter, NJ (US); Adinath Narasgond, Yonkers, NY (US); Bucknell C. Webb, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/416,564

(22) Filed: Jan. 26, 2017

(65) Prior Publication Data

US 2017/0324068 A1    Nov. 9, 2017

Related U.S. Application Data

(60) Provisional application No. 62/333,523, filed on May 9, 2016.

(51) Int. Cl.
*H01M 50/10* (2021.01)
*H01M 50/209* (2021.01)
(Continued)

(52) U.S. Cl.
CPC ............. *H01M 50/10* (2021.01); *H01M 6/40* (2013.01); *H01M 10/0436* (2013.01); *H01M 50/209* (2021.01); *H01M 2220/30* (2013.01)

(58) Field of Classification Search
CPC .. H01M 2/0207; H01M 2/1061; H01M 2/364; H01M 2/08; H01M 2220/30;
(Continued)

(56) References Cited

U.S. PATENT DOCUMENTS 6,051,117 A * 4/2000 Novak ...................... C25B 9/00
                                                              204/252
2010/0129717 A1   5/2010 Bedjaoui et al.
(Continued)

FOREIGN PATENT DOCUMENTS

CN    102412420 A    4/2012
CN    103928699 A    7/2014
(Continued)

OTHER PUBLICATIONS

List of IBM Patents or Patent Applications Treated as Related Dated Nov. 13, 2017, 2 Pages.
(Continued)

*Primary Examiner* — Brian R Ohara
(74) *Attorney, Agent, or Firm* — Scully, Scott, Murphy & Presser, P.C.; Joseph Petrokaitis

(57) ABSTRACT

A micro-battery is provided in which a metallic sealing layer is used to provide a hermetic seal between an anode side of the micro-battery and the cathode side of the micro-battery. In accordance with the present application, the metallic sealing layer is formed around a perimeter of each metallic anode structure located on the anode side and then the metallic sealing layer is bonded to a solderable metal layer of a wall structure present on the cathode side. The wall structure contains a cavity that exposes a metallic current collector structure, the cavity is filled with battery materials.

10 Claims, 7 Drawing Sheets

(51) Int. Cl.
*H01M 6/40* (2006.01)
*H01M 10/04* (2006.01)

(58) Field of Classification Search
CPC ........... H01M 10/0525; H01M 10/482; H01M 4/133; H01M 4/663; H01M 4/0404; H01M 4/0409; H01M 4/0414; H01M 4/0473; H01M 4/08; H01M 4/139; H01M 4/62; H01M 4/661; H01M 4/70; H01M 4/76; H01M 4/765; H01M 4/8817; H01M 4/8803; H01M 4/8814; H01M 8/1076
See application file for complete search history.

(56) References Cited

U.S. PATENT DOCUMENTS

| | | | |
|---|---|---|---|
| 2013/0128488 A1 | 5/2013 | Forster et al. | |
| 2014/0209159 A1 | 7/2014 | Nl et al. | |
| 2015/0001519 A1* | 1/2015 | Matsuura | H01L 33/38 257/40 |
| 2016/0056417 A1 | 2/2016 | Flitsch et al. | |

FOREIGN PATENT DOCUMENTS

| | | |
|---|---|---|
| CN | 104081880 A | 10/2014 |
| CN | 105390726 A | 3/2016 |

OTHER PUBLICATIONS

Office Action dated Sep. 3, 2021 received in U.S. Appl. No. 15/811,231.
"Test method for performance of structural ceramic materials for electronic components Determination of microstructure" dated Nov. 27, 1985, 2 pages https://www-52biaozhun-com.translate.goog/index/dl/32089.html?_x_tr_skzh-CN&_X_tr_tl=en&_x_tr_hl=en&_x_tr_pto=sc.
International Search Report and Written Opinion dated Aug. 4, 2017 received in a corresponding foreign application, 12 pages.

* cited by examiner

SIMPLIFIED HERMETIC PACKAGING OF A MICRO-BATTERY

CROSS REFERENCE TO RELATED APPLICATION

The present application claims the benefit of U.S. Provisional Patent Application No. 62/333,523 filed May 9, 2016, the entire content and disclosure of which are incorporated herein by reference.

BACKGROUND

The present application relates to a micro-battery, and more particularly to hermetic sealing (i.e., packaging) of a micro-battery using a monolithic metal seal approach.

Hermetic sealing of a micro-battery is critical for wearable and implantable health care devices. In conventional wearable and implantable health care devices, sealing of the micro-battery is typically achieved utilizing a polymeric material. Polymeric sealing is not sufficient for hermeticity. Metal sealing is more desirable than polymeric sealing because it can provide an ultra-thin sealing structure with improved hermeticity. Monolithic metal deposition can offer high production efficiency with batch processing, which is especially promising for the anode and cathode electrodes of a micro-battery.

SUMMARY

A micro-battery is provided in which a metallic sealing layer is used to provide a hermetic seal between an anode side of the micro-battery and the cathode side of the micro-battery; the term "micro-battery" is used throughout the present application to denote a battery having a minimum dimension from 10 microns to 1,000 microns. In accordance with the present application, the metallic sealing layer is formed around a perimeter of each metallic anode structure located on the anode side and then the metallic sealing layer is bonded to a solderable metal layer of a wall structure present on the cathode side. The wall structure contains a cavity that exposes a metallic current collector structure, the cavity is filled with battery materials.

In one aspect of the present application, a micro-battery is provided. In one embodiment of the present application, the micro-battery includes a metallic current collector structure spaced apart from a metallic anode structure by a hermetic sealed wall structure. The hermetic sealed wall structure of the present application defines a cavity between the metallic current collector structure and the metallic anode structure and contains a metallic sealing layer in direct contact with a surface of the metallic anode structure.

In another aspect of the present application, a method of forming micro-batteries is provided. In one embodiment of the present application, the method includes providing a first structure comprising a handler substrate, a release layer, and at least one metallic anode structure, wherein a metallic sealing layer is located on a surface of each metallic anode structure. A second structure is provided that comprises another handle substrate, a polymeric adhesive, and at least one metallic current collector structure embedded in the polymeric adhesive, wherein a wall structure having a cavity is located on a surface of each metallic current collector structure, the wall structure comprises a solderable metal. Next, the metallic sealing layer of the first structure is bonded to the solderable metal of each wall structure, and thereafter the handler substrate, the another handler substrate, the release layer, and the polymeric adhesive layer are removed to provide at least one micro-battery.

DETAILED DESCRIPTION

Figure 1:
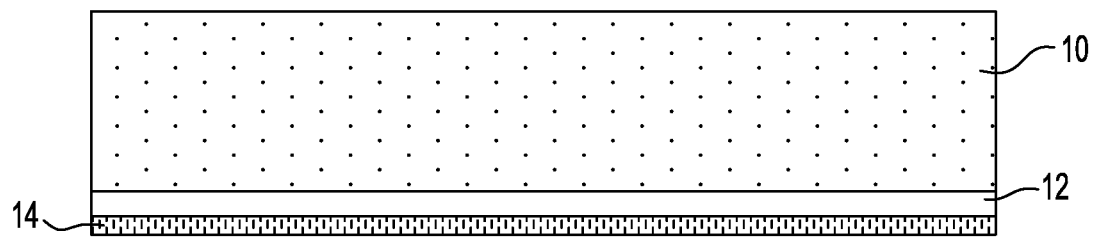
FIG. 1 is a cross sectional view of a first exemplary structure including a handler substrate, a release layer and a metallic seed layer that can be employed in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated a first exemplary structure including a handler substrate 10, a release layer 12 and a metallic seed layer 14 that can be employed in accordance with an embodiment of the present application; the first exemplary structure shown in FIGS. 1-4 represents the anode side of the micro-battery of the present application. In the embodiment illustrated, the first exemplary structure shown in FIGS. 1-4 is shown flipped upside to illustrate that the first exemplary structure is used as a top component of the micro-battery of the present application; the bottom component of the micro-battery of the present application is the second exemplary structure shown in FIGS. 5-10.

The first exemplary structure of FIG. 1 can be formed by first providing the handler substrate 10. The handler substrate 10 may be composed of any handler material including, but not limited to, glass or silicon. The handler substrate 10 that may be used in the present application may have a thickness from 700 microns to 780 microns. Other thicknesses that are lesser than, or greater than, the aforementioned thickness values may also be used as the thickness of the handler substrate 10.

After providing the handler substrate 10, release layer 12 is formed on a surface of the handler substrate 10. As is shown, the release layer 12 is a continuous layer that covers an entire surface of the handler substrate 10. The release layer 12 may include any material that can be readily removed from the handler substrate 10 during a subsequent process. In one embodiment, the release layer 12 is a laser ablatable material. By "laser ablatable material" it is meant any material that can be removed utilizing laser ablation. Laser ablation is a process of removing a material from a surface of another material by irradiating the material with a laser beam. In one example, the laser ablatable material that can be used as the release layer 12 is a carbon black rich polymer such as, for example, 3M LTHC®. By 'carbon black rich', it meant a polymeric material that contains greater than 20 wt. % carbon black. The release layer 12 may be formed utilizing a deposition process such as, for example, chemical vapor deposition, plasma enhanced chemical vapor deposition, evaporation, or spin-on coating. The release layer 12 may have a thickness from 100 nm to 2000 nm. Other thicknesses that are lesser than, or greater than, the aforementioned thickness values may also be used as the thickness of the release layer 12.

After providing the release layer 12, a metallic seed layer 14 can be formed on a surface of the release layer 12. As is shown, the metallic seed layer 14 is a continuous layer that covers an entire surface of the release layer 12. In some embodiments, the formation of the metallic seed layer 14 may be omitted. When employed, the metallic seed layer 14 includes a metal or metal alloy that can facilitate the growth of another metal or metal alloy. The metallic seed layer 14 that can be employed in the present application may include, but is not limited to, Ti (30 nm)/Cu (200 nm). The metallic seed layer 14 may be formed utilizing a physical vapor deposition (PVD) process. The metallic seed layer 14 may have a thickness from 10 nm to 500 nm. Other thicknesses that are lesser than, or greater than, the aforementioned thickness values may also be used as the thickness of the metallic seed layer 14.

Figure 2:
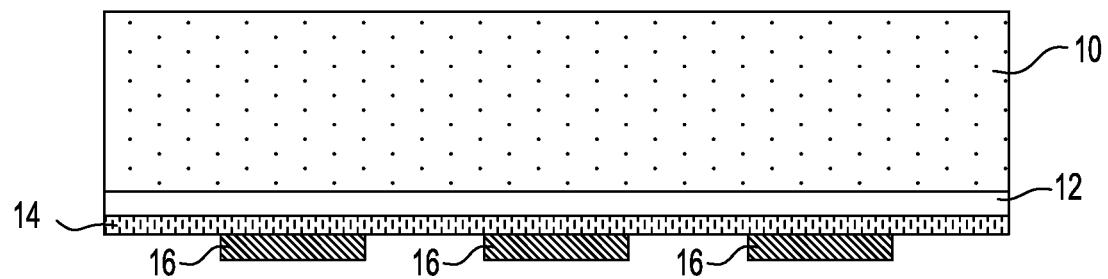
FIG. 2 is a cross sectional view of the first exemplary structure of FIG. 1 after forming a plurality of metallic anode structures on the metallic seed layer.

Referring now to FIG. 2, there is illustrated the first exemplary structure of FIG. 1 after forming a plurality of metallic anode structures 16 on the metallic seed layer 14. In some embodiments, the metallic anode structures 16 may be formed on the release layer 12. The number of metallic anode structures 16 that are formed may vary so long as at least one metallic anode structure is formed.

Each metallic anode structure 16 that is provided is spaced apart from one another by a gap (not specifically labeled in the drawings of the present application). In the illustrated embodiment, the gap that is located between each metallic anode structure 16 exposes a portion of the metallic seed layer 14. The shape of each metallic anode structures 16 may vary. In one example, each metallic anode structure 16 that is formed is circular (i.e., round); this is better seen in FIG. 3B of the present application.

Each metallic anode structure 16 includes at least one conductive metallic anode material such as, for example, nickel, nickel/zinc, or copper. In some embodiments the metallic anode structures 16 may include a barrier material such as, for example, titanium. When a barrier material is employed, the barrier material is formed first followed by the at least one first conductive metallic anode material. In one embodiment of the present application, each metallic anode structure 16 is composed of a material stack of a layer of titanium, a layer of nickel on a surface of the layer of titanium, and a layer of zinc on a surface of the layer of nickel (i.e., Ti/Ni/Zn stack).

The metallic anode structures 16 may be formed by first forming blanket layers of each individual component that provides the metallic anode structures 16, followed by patterning the blanket layers. The forming of the blanket layers of each individual component that provides the metallic anode structures 16 may include one or more deposition processes. In one example, electroplating can be used to deposit the blanket layers of each individual component that provides the metallic anode structures 16.

The patterning may be performed by lithography and etching. Lithography includes forming a photoresist material (not shown) atop a material or material stack to be patterned. The photoresist material may include a positive-tone photoresist composition, a negative-tone photoresist composition or a hybrid-tone photoresist composition. The photoresist material may be formed by a deposition process such as, for example, spin-on coating. After forming the photoresist material, the deposited photoresist material is subjected to a pattern of irradiation. Next, the exposed photoresist material is developed utilizing a conventional resist developer. This provides a patterned photoresist atop a portion of the material or material stack to be patterned. The pattern provided by the patterned photoresist material is thereafter transferred into the underlying material layer or material stack to be patterned utilizing at least one pattern transfer etching process. Typically, the at least one pattern transfer etching process is an anisotropic etch. In one embodiment, a dry etching process such as, for example, reactive ion etching can be used. In another embodiment, a chemical etchant can be used. In still a further embodiment, a combination of dry etching and wet etching can be used.

Figure 3A:
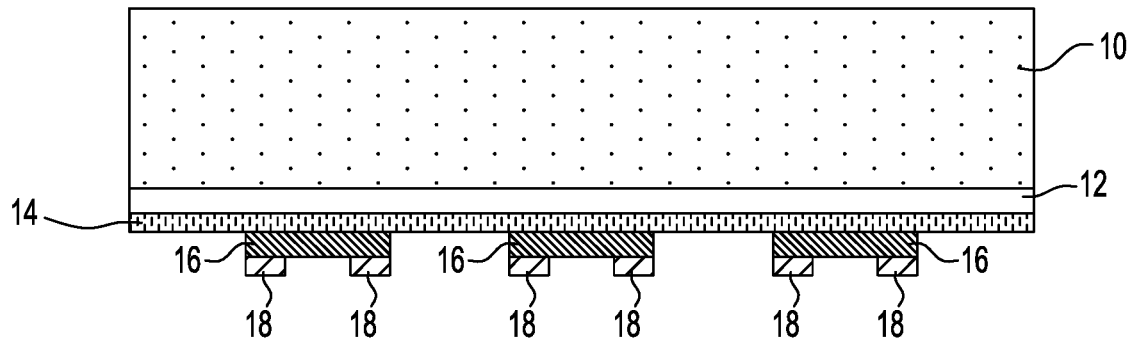
FIG. 3A is a top down view of first exemplary structure of FIG. 2 after forming a metallic sealing layer around a perimeter of a physically exposed surface of each metallic anode structure.
Figure 3B:
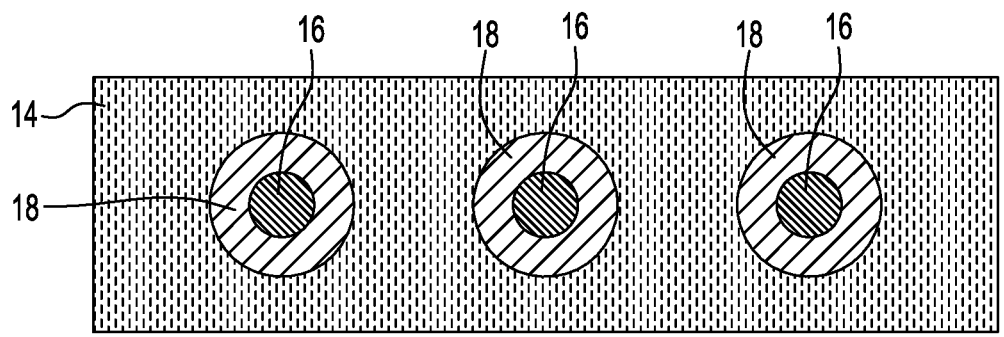
FIG. 3B is a cross sectional view of the first exemplary structure of FIG. 2 after forming a metallic sealing layer around a perimeter of a physically exposed surface of each metallic anode structure.

Referring now to FIGS. 3A-3B, there are illustrated various views of the first exemplary structure of FIG. 2 after forming a metallic sealing layer 18 around the perimeter of a physically exposed surface of each metallic anode structure 16. The metallic sealing layer 18 does not cover the entirety of the metallic anode structure 16, but is instead confined to an outermost portion of the metallic anode structure 16 such that an inner portion of the metallic anode structure 16 is exposed. In one example, the metallic sealing layer 18 is ring (i.e., donut) shaped.

The metallic sealing layer 18 may include any metal or metal alloy that can be used to form a hermetic seal. In one embodiment of the present application, the metallic sealing layer 18 may include an indium-containing material. By "indium-containing material" is meant pure indium metal or an alloy of indium such as, for example, an indium tin alloy.

The metallic sealing layer 18 may be formed by depositing the metal or metal alloy that provides the metallic sealing layer 18, and thereafter patterning the deposited metal or metal alloy to provide the metallic sealing layer 18. Patterning may be performed by lithography and etching as defined above. The metallic sealing layer 18 may have a thickness from 1000 nm to 10,000 nm. Other thicknesses that are lesser than, or greater than, the aforementioned thickness values may also be used as the thickness of the metallic seed layer 14.

Figure 4:
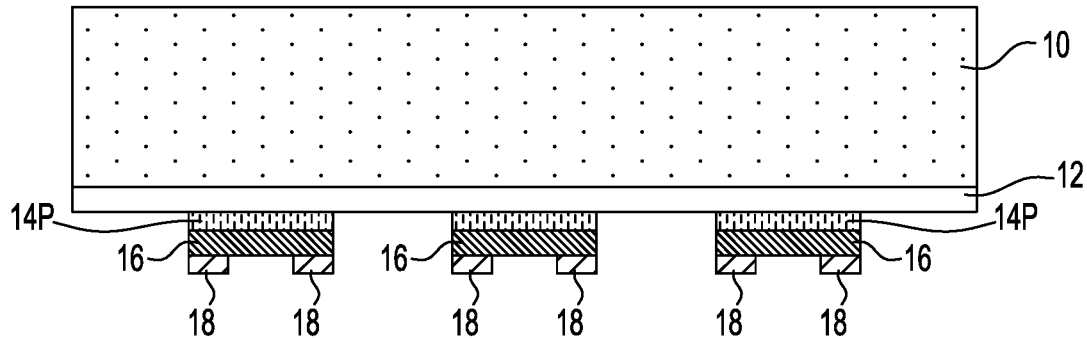
FIG. 4 is a cross sectional view of the first exemplary structure of FIGS. 3A-3B after removing exposed portions of the metallic seed layer.

Referring now to FIG. 4, there is illustrated the first exemplary structure of FIGS. 3A-3B after removing exposed portions of the metallic seed layer 14. The remaining portion of the metallic seed layer 14 may be referred to herein after as a metallic seed layer portion 14P. In some embodiments in which no metallic seed layer 14 is employed, this step of the present application may be omitted.

The removal of the exposed portions of the metallic seed layer 14 may be performed utilizing an etch that is selective in removing the metallic seed layer 14. In such an embodiment, each metallic anode structure 16 and the metallic sealing layer 18 can be used as a combined etch mask. After removing the exposed portions of the metallic seed layer 14, the metallic seed layer portion 14P has an outermost surface that is vertically aligned with the outermost surface of the metallic anode structure and the outermost surface of the metallic sealing layer 18. As is shown, portions of the release layer 12 are now exposed.

Figure 5:
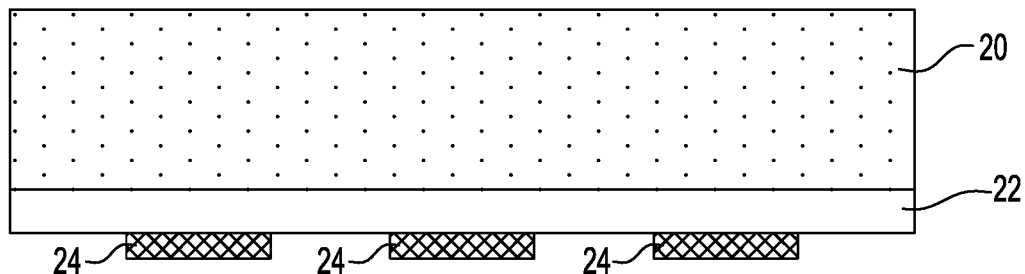
FIG. 5 is a cross sectional view of a second exemplary structure including a semiconductor substrate, an insulator layer and a plurality of metallic current collector structures on the insulator layer that can be employed in accordance with an embodiment of the present application.

Referring now to FIG. 5, there is illustrated a second exemplary structure including a semiconductor substrate 20, an insulator layer 22 and a plurality of metallic current collector structures 24 on the insulator layer 22. The second exemplary structure is used in the present application to provide the cathode side of the micro-battery. It should be noted that the anode side and the cathode side of the micro-battery of the present application can be formed in any order. The number of metallic current collector structures 24 that are formed matches the number of metallic anode structures 16 that are formed. Also, the size and shape of each metallic current collector structure 24 that is formed are the same as the size and shape of each metallic anode structure 16 that is formed. Typically, each metallic current collector structure 24 and each metallic anode structure 16 are circular in shape.

The second exemplary structure of FIG. 5 can be formed by first providing the semiconductor substrate 20. The semiconductor substrate 20 may include any semiconductor material having semiconductor properties. Examples of semiconductor materials that can be used to provide the semiconductor substrate 20 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

The semiconductor substrate 20 is typically a bulk semiconductor substrate. By "bulk" it is meant that the semiconductor substrate 20 is entirely composed of at least one semiconductor material, as defined above. In one example, the semiconductor substrate 20 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of silicon and a silicon germanium alloy.

The semiconductor material that provides the semiconductor substrate 20 may be a single crystalline semiconductor material. The semiconductor substrate 20 may have a first thickness. The first thickness of the semiconductor substrate 20 may be from 100 microns to 780 microns. Other thicknesses that are lesser than, or greater than, the aforementioned thickness range may also be used as the thickness of the semiconductor substrate 20.

After providing the semiconductor substrate 10, insulator layer 22 is formed. As is shown, the insulator layer 22 is a continuous layer that covers an entire surface of the semiconductor substrate 20. The insulator layer 22 may include any dielectric material including, but not limited to, silicon dioxide, silicon nitride and/or silicon oxynitride. The insulator layer 22 may be formed utilizing a deposition process such as, for example, chemical vapor deposition or plasma enhanced chemical vapor deposition. The insulator layer 22 may have a thickness from 100 nm to 5000 nm. Other thicknesses that are lesser than, or greater than, the aforementioned thickness values may also be used in the present application as the thickness of the insulator layer 22.

After providing the insulator layer 22, the plurality of metallic current collector structures 24 is formed on the insulator layer 22. Each current collector structure 24 includes at least one conductive metallic material such as, for example, titanium or platinum. In one embodiment of the present application, each metallic current collector structure 24 is composed of titanium.

The metallic current collector structures 24 may be formed by first forming a blanket layer of the at least one conductive metallic material that provides the metallic current collector structures 24, followed by patterning the blanket layer. The forming of the blanket layer of at least one conductive metallic material that provides the metallic current collector structures 24 may include one or more deposition processes. In one example, evaporation can be used to deposit the blanket layer of the at least one conductive metallic material that provides the metallic current collector structures 24.

Figure 6:
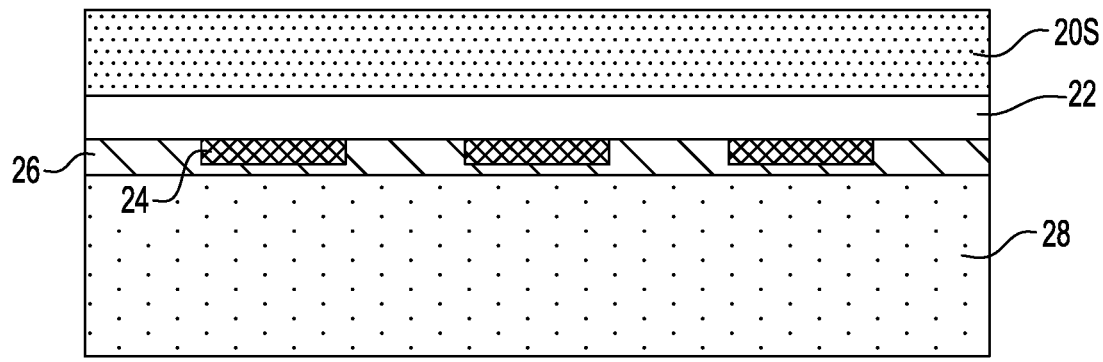
FIG. 6 is a cross sectional view of the second exemplary structure of FIG. 5 after forming a polymeric adhesive on physically exposed surfaces of the insulator layer and each metallic current collector structure, forming a handler substrate on the polymeric adhesive, and thinning the semiconductor substrate.

Referring now to FIG. 6, there is illustrated the second exemplary structure of FIG. 5 after forming a polymeric adhesive 26 on physically exposed surfaces of the insulator layer 22 and each metallic current collector structure 24, forming a handler substrate 28 on the polymeric adhesive 26, and thinning the semiconductor substrate 20. The thinned semiconductor substrate is labeled as element 20S in the drawings of the present application. In some embodiments, thinning of the semiconductor substrate 20 may be omitted.

The polymeric adhesive 26 that is employed is a continuous layer that is formed on the exposed surfaces (including top and sidewalls) of each metallic current collector structure 24 as well as the exposed surface of the insulator layer 22. The polymeric adhesive 26 thus laterally surrounds and encases each metallic current collector structure 24. The polymeric adhesive material 26 may include any adhesive material that contains at least one polymeric component. In one example, the polymeric adhesive 26 is composed of a non-photodefinable polyimide such as HD3007® (HD3007® is a registered trademark of HD MicroSystems).

In one embodiment, the polymeric adhesive 26 may be formed directly on the second exemplary structure shown in FIG. 5 utilizing a deposition process such as, for example, spin-on coating. The polymeric adhesive 26 may have a thickness from 500 nm to 5000 nm. Other thicknesses that are lesser than, or greater than, the aforementioned thickness values may also be used for thickness of the polymeric adhesive 26.

Handler substrate 28 (which may be referred to a second handler substrate) is then formed on a physically exposed surface of the polymeric adhesive layer utilizing a wafer bonding process. The handler substrate 28 may include one of the materials mentioned above for handler substrate 10 (handler substrate 10 may be referred to as a first handler substrate). In one embodiment, the material that provides the handler substrate 28 is the same as the material that provides the handler substrate 10. In yet another embodiment, the material provides the handler substrate 28 is different from the material that provides the handler substrate 10. The handler substrate 28 may have a thickness with the thickness range mentioned above for the first handler substrate 10.

Next, and in some embodiments, semiconductor substrate 20 may be thinned utilizing a thinning process such as, for example, etching, or a combination of oxidation and etching. The thinned semiconductor substrate 20S has a second thickness that is less than the first thickness.

Figure 7:
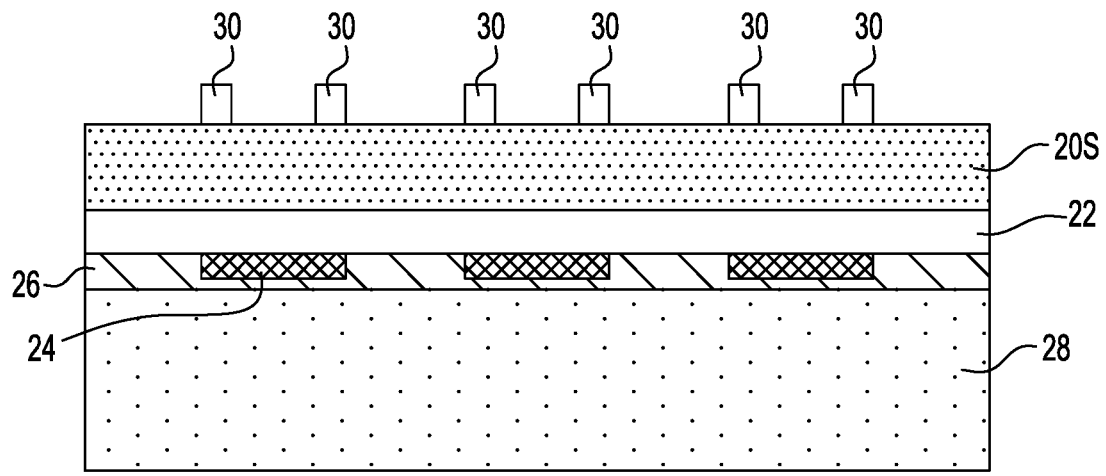
FIG. 7 is a cross sectional view of the second exemplary structure of FIG. 6 after forming a plurality of etch masks on a physically exposed surface of the thinned semiconductor substrate.

Referring now to FIG. 7, there is illustrated the second exemplary structure of FIG. 6 after forming a plurality of etch masks 30 on a physically exposed surface of the thinned semiconductor substrate 20S; when the semiconductor substrate 20 is not subjected to thinning the etch masks 30 are formed directly on a physically exposed surface of semiconductor substrate 20. Thus, the etch masks 30 are formed on a semiconductor material surface.

Each etch mask 30 is composed of a dielectric hard mask material such as, for example, silicon dioxide, silicon nitride, and/or silicon oxynitride. Each etch mask 30 may be formed by providing a blanket layer of the dielectric hard mask material and thereafter patterning the blanket layer of dielectric hard mask material. The dielectric hard mask material may be provided utilizing a deposition process such as, for example, chemical vapor deposition or plasma enhanced chemical vapor deposition. Patterning may be achieved by lithography and etching as defined above. The dielectric hard mask material that provides each etch mask 30 may have a thickness from 5 nm to 25 nm. Other thicknesses that are lesser than, or greater than, the aforementioned thickness values may also be used as the thickness of the dielectric hard mask material. Each etch mask 30 is designed to have a same size and shape as the metallic sealing layer 18.

Figure 8:
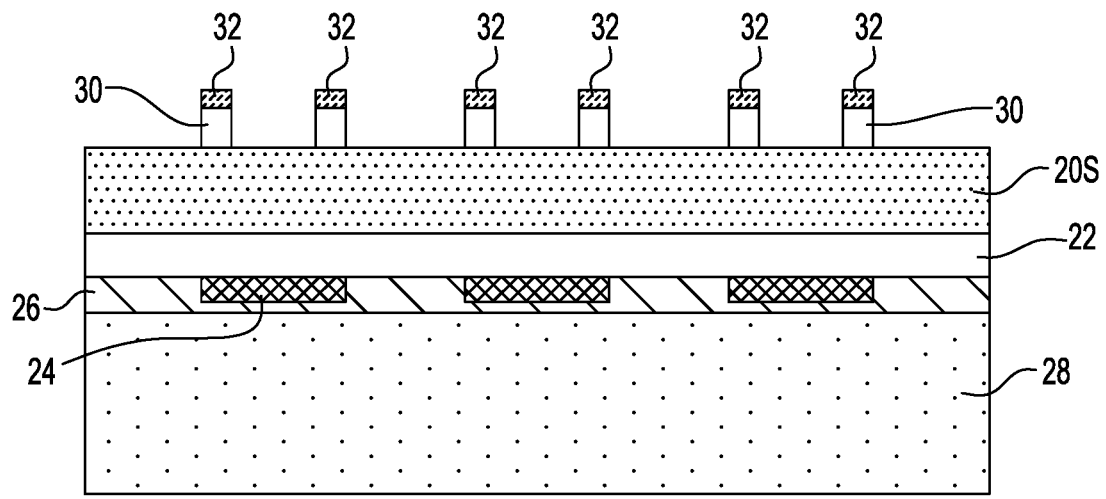
FIG. 8 is a cross sectional view of the second exemplary structure of FIG. 7 after forming a solderable metal on a physically exposed surface of each etch mask.

Referring now to FIG. 8, there is illustrated the second exemplary structure of FIG. 7 after forming a solderable metal 32 on a physically exposed surface of each etch mask 30. The solderable metal 32 that is employed in the present application includes any fusible metal or metal alloy that can be used to create a permanent bond between to work pieces. Examples of solderable materials that can be used as the solderable metal 32 include, but are not limited to, gold, tin, and indium. The solderable metal 32 may be formed by deposition and patterning. The solderable metal 32 may have a thickness from 5 nm to 20 nm. Other thicknesses that are lesser than, or greater than, the aforementioned thickness values may also be used as the thickness of the solderable metal 32.

Figure 9:
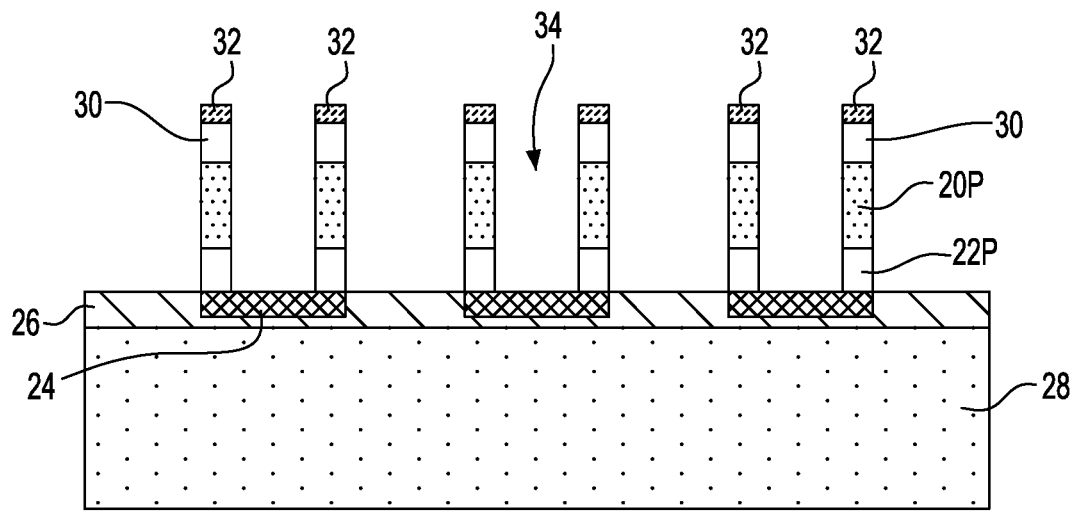
FIG. 9 is a cross sectional view of the second exemplary structure of FIG. 8 after performing an etch to from a plurality of cavities, each cavity is located within a wall structure.

Referring now to FIG. 9, there is illustrated the second exemplary structure of FIG. 8 after performing an etch to from a plurality of cavities 34, each cavity 34 is located within a wall structure (22P, 20P, 30, 32). Each wall structure includes, from bottom to top, a remaining portion of the insulator layer 22 (hereinafter insulator layer portion 22P), a remaining portion of the semiconductor substrate 20 or thinned semiconductor substrate 20S (hereinafter semiconductor material portion 20P), etch mask 30, and solderable metal 32. Each wall structure (22P, 20P, 30, 32) has vertical sidewalls and is located around the perimeter of the underlying metallic current collector structures 24. Each wall structure is designed to have a same shape and size as each metallic sealing layer 18. In one embodiment, each wall structure (22P, 20P, 30, 32) and each metallic sealing layer 18 is circular. Each cavity 34 exposes a remaining portion of the underlying metallic current collector structures 24.

The etch used to define each cavity 34 may include an anisotropic etching process such as, for example, reactive ion etching. The etching employs each etch mask 30 as an etch mask. The etch mask first provides an openings in the semiconductor substrate 20 or thinned semiconductor substrate 20S, and then the etching continues providing an opening in the underlying insulator layer 22.

Figure 10:
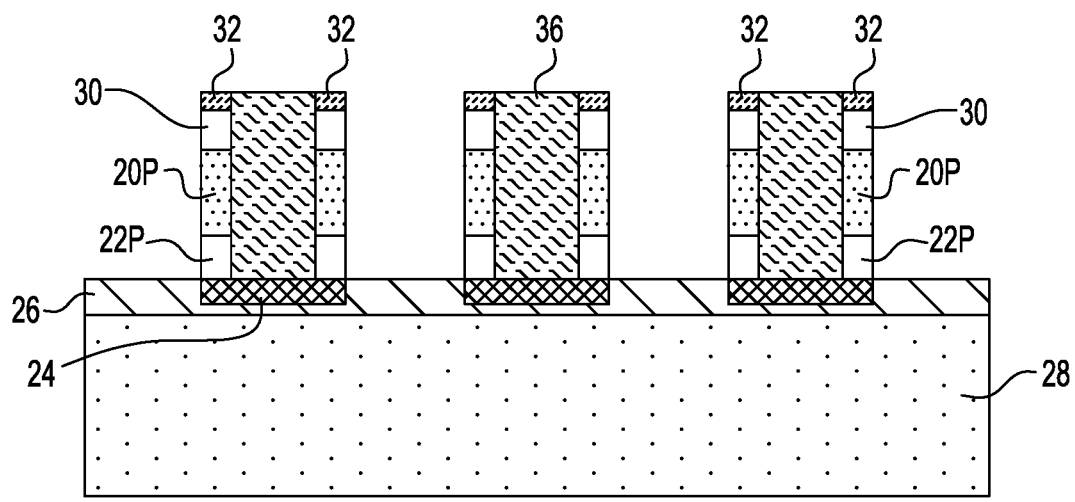
FIG. 10 is a cross sectional view of the second exemplary structure of FIG. 9 after filling each cavity with battery materials.

Referring now to FIG. 10, there is illustrated the second exemplary structure of FIG. 9 after filling each cavity 34 with battery materials 36. The battery materials 36 may include well known materials such as, for example, a cathode material such as, for example, $MnO_2$, an electrolyte, separator, and a hydro-gel. The battery materials 36 may be polymeric, liquid and/or gels, and can be provided to each cavity 34 utilizing any well known filling technique.

Figure 11:
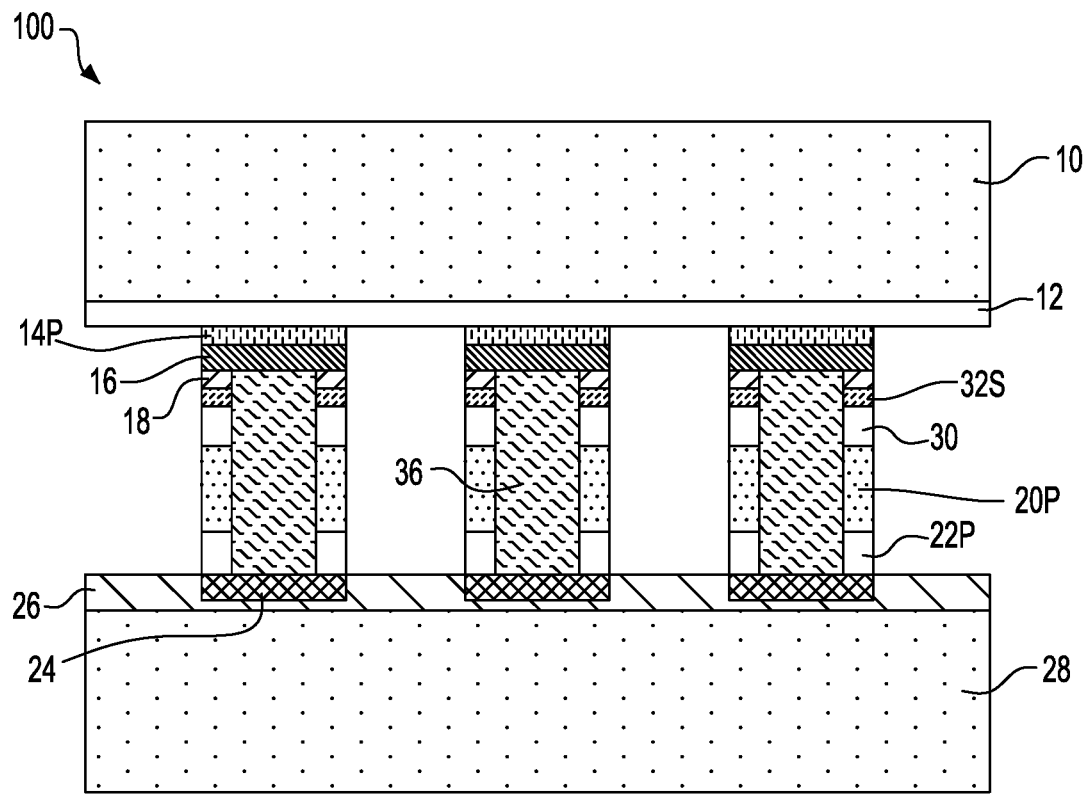
FIG. 11 is a cross sectional view of a bonded structure containing a plurality of micro-batteries that is formed after bonding the first exemplary structure of FIG. 4 and the second exemplary structure of FIG. 10 together.

Referring now to FIG. 11, there is illustrated a bonded structure 100 containing a plurality of micro-batteries (three of which are shown, by way of one example, in FIG. 11) that is formed after bonding the first exemplary structure of FIG. 4 and the second exemplary structure of FIG. 10 together. The bonding of the first exemplary structure of FIG. 4 to the second exemplary structure of FIG. 10 is performed by bringing the two exemplary structures together such that the metallic sealing layer 18 of the first exemplary structure is in direct physical contact with the solderable metal 32 of the second exemplary structure. Bonding continues via a soldering process with elevated temperature or cold welding with a high compression force. By "elevated temperature" it is meant a temperature of 100° C. or greater. By "high compression force" it is meant a force of 10 kN or greater. In FIG. 11, element 32S denotes a soldered joint that includes the solderable metal 32.

Each micro-battery includes a metallic current collector structure 24 spaced apart from a metallic anode structure 16 by a hermetic sealed wall structure. The hermetic sealed wall structure defines a cavity between the metallic current collector structure 24 and the metallic anode structure 16. The hermetic sealed wall structure contains a metallic sealing layer 18 in direct contact with a surface of the metallic anode structure 16.

The hermetic sealed wall structure further includes a soldered joint 32S composed of a solderable metal 32, an etch mask 30 composed of a dielectric hard mask material, a semiconductor material portion 20P, and an insulator portion 22P. Typically, the hermetic sealed wall structure (18, 32S, 30, 20P, 22P) is ring shaped. The cavity 34 that is located laterally between the hermetic sealed wall structure (18, 32S, 30, 20P, 22P) and vertically between the metallic current collector structure 24 and the metallic anode structure 16 is filled with battery materials 36.

Figure 12:
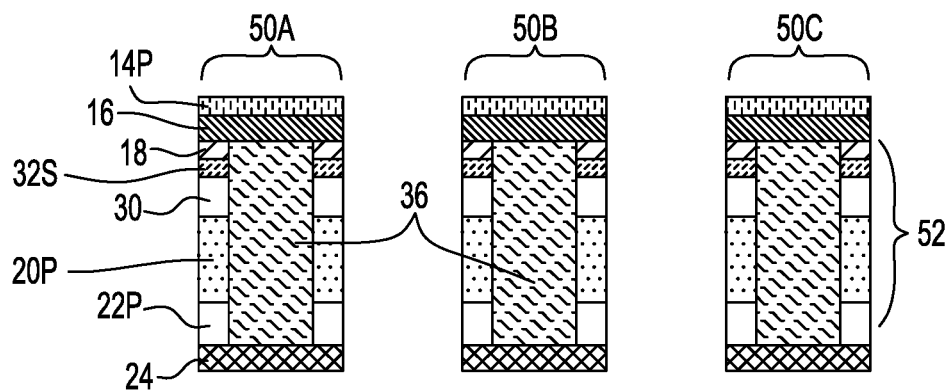
FIG. 12 is a cross sectional view of the bonded structure shown in FIG. 11 after singulation of each micro-battery.

Referring now to FIG. 12, there is illustrated the bonded structure shown in FIG. 11 after singulation of each micro-battery (50A, 50B, 50C). Singulation includes removing the first handler substrate 10, the second handler substrate 28, the release layer 12, and the polymeric adhesive layer 26 to provide at least one micro-battery (50A, 50B, 50C). In one embodiment, a laser ablation process can be used to remove the release layer 12 and the first handler substrate 10, while another laser ablation process or etching can be used to remove the polymeric adhesive layer 26 and the second handler substrate 28.

As stated above, each micro-battery (50A, 50B, 50C) includes a metallic current collector structure 24 spaced apart from a metallic anode structure 16 by a hermetic sealed wall structure 52. The hermetic sealed wall structure 52 defines a cavity between the metallic current collector structure 24 and the metallic anode structure 16 and contains a metallic sealing layer 18 in direct contact with a surface of the metallic anode structure 16. The hermetic sealed wall structure 52 further includes a soldered joint 32S composed of the solder metal, an etch mask 30 composed of a dielectric hard mask material, a semiconductor material portion 20P, and an insulator portion 22P. Typically, the hermetic sealed wall structure 52 is ring shaped. The cavity that is located laterally between the hermetic sealed wall structure 52 and vertically between the metallic current collector structure 24 and the metallic anode structure 16 is filled with battery materials 36.

Figure 13:
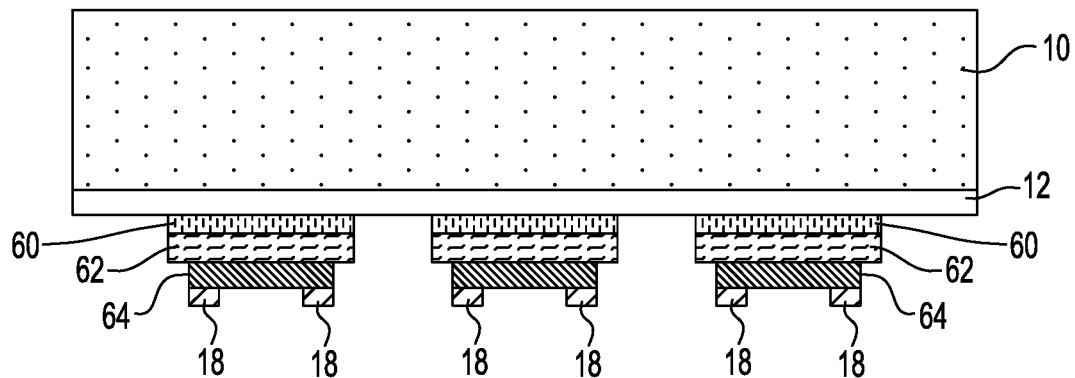
FIG. 13 is a cross sectional view illustrating another first exemplary structure containing a metallic anode structure that can be employed in another embodiment of the present application.

Referring now to FIG. 13, there is illustrated another first exemplary structure containing a metallic anode structure (60, 62, 64) that can be employed in another embodiment of the present application. The metallic anode structure of this embodiment of the present application includes a metal base 60 that is located directly on a surface of the release layer 12, a low temperature solder 62 located on the metal base 60, and a conductive metallic anode material 64 located on the low temperature solder. Metallic sealing layer 18 as defined above is present on the conductive metallic anode material 64.

The metal base 60 which serves as an anode collector includes any metal such as, for example, nickel, copper, or zinc. The metal base 60 typically has a thickness from 5000 nm to 20,000 nm. The low temperature solder 62 includes a metal solder such as, for example, indium, tin, and an indium tin alloy. By "low temperature" it is meant that the metal solder 62 has a melting point below 169° C. The conductive metallic anode material 64 includes any anode metal such as, for example, zinc, nickel or copper. The metallic anode structure (60, 62, 64) can be formed by utilizing techniques well known to those skilled in the art. For example, the metallic anode structure (60, 62, 64) can be formed by first providing a blanket layer of the metal that provides the metal base 60. The blanket layer of the metal that provides the metal base 60 may be formed by a deposition process including electroplating. The blanket layer of metal is then patterned. Patterning may be achieved by lithography and etching. Next, the metal solder is formed on the metal base 60 utilizing any deposition process. The conductive metallic anode material 64 is then formed on the metal solder 62.

Figure 14:
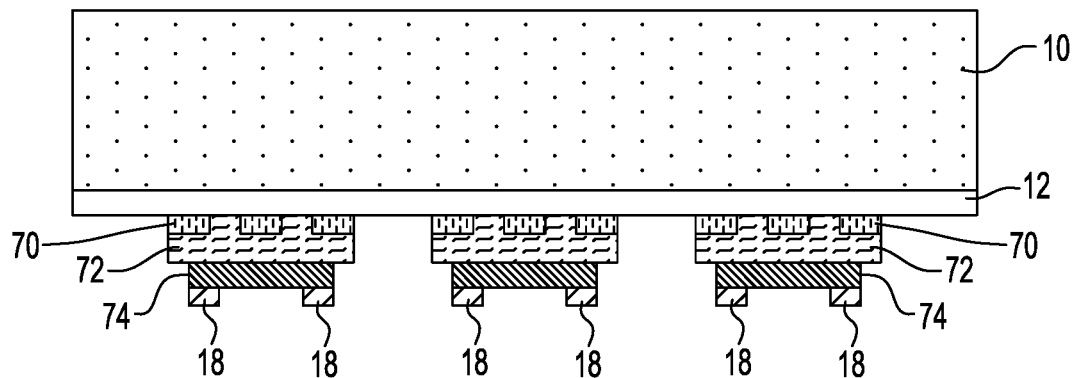
FIG. 14 is a cross sectional view illustrating yet another first exemplary structure containing a metallic anode structure that can be employed in yet another embodiment of the present application.

Referring now to FIG. 14, there is illustrated yet another first exemplary structure containing a metallic anode structure (70, 72, 74) that can be employed in yet another embodiment of the present application. The metallic anode structure of this embodiment includes a photoimaged polymer 70 located directly on a surface of the release layer 12, a conductive pad 72 located on, and between, the photoimaged polymer 70, and a conductive metallic anode material 74 located on the conductive pad 72. As is shown, at least a portion of the conductive pad 72 is embedded in the photoimaged polymer. Metallic sealing layer 18 as defined above is present on the conductive metallic anode material 74.

The photoimaged polymer 70 includes any photoimageable polymeric material that can be patterned directly, without utilizing a separate photoresist material. Examples of photoimageable polymers that can be used in the present application include BCB (i.e., benzocyclobutene) or PSPI (i.e., a photosensitive polyimide). The photoimaged polymer 70 can be formed utilizing processes well known to those skilled in the art. The conductive pad 72 includes one of more conductive metals. In one example, the conductive pad 72 may include Ti/Ni/In or Ti/Ni/Sn. The conductive metallic anode material 74 includes any anode metal such as, for example, zinc or indium. The metallic anode structure (70, 72, 74) can be formed by utilizing techniques well known to those skilled in the art.

The structures shown in FIGS. 13 and 14 can be bonded to the second exemplary structure shown in FIG. 10 and thereafter singulated as described above to provide discrete micro-batteries.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A micro-battery comprising:
   a metallic current collector structure spaced apart from a metallic anode structure by a hermetic sealed wall structure, the hermetic sealed wall structure surrounding an entirety of a perimeter of a cavity that is located between the metallic current collector structure and the metallic anode structure, wherein the hermetic sealed wall structure comprises a metallic sealing layer in direct physical contact with a first surface of the metallic anode structure; and battery materials comprising at least a cathode material and an electrolyte located in the cavity and contacting an innermost wall of the hermetic sealed wall structure, wherein the battery materials have a first surface directly contacting a first surface of the metallic current collector structure, and a second surface, opposite the first surface, directly contacting the first surface of the metallic anode structure.

2. The micro-battery of claim 1, wherein the hermetic sealed wall structure further comprises a soldered joint in direct contact with the metallic sealing layer, an etch mask in direct physical contact with the soldered joint, a semiconductor material in direct contact with the etch mask, and an insulator material having a first surface in direct contact with the semiconductor material and a second surface, opposite the first surface that is in direct contact with the first surface of the metallic current collector.

3. The micro-battery of claim 2, wherein the etch mask comprises silicon nitride or silicon oxide.

4. The micro-battery of claim 1, wherein the metallic anode structure comprises at least a conductive metallic anode material.

5. The micro-battery of claim 4, wherein the metallic anode structure comprises a metal base, a metal solder, and a conductive metallic anode material.

6. The micro-battery of claim 1, wherein the metallic anode structure comprises a photoimaged polymer, a conductive pad, and a conductive metallic anode material, wherein at least a portion of the conductive pad is embedded in the photoimaged polymer.

7. The micro-battery of claim 1, wherein the metallic current collector structure comprises a conductive metallic material.

8. The micro-battery of claim 1, wherein a metallic seed layer is located on a second surface of the metallic anode structure which is opposite the first surface of the metallic anode structure.

9. The micro-battery of claim 1, where the metallic sealing layer comprises indium or an alloy of indium.

10. The micro-battery of claim 1, wherein the metallic sealing layer is ring shaped.

* * * * *